Nov. 28, 1967  G. W. ANDERSON ET AL  3,354,613
PACKAGING APPARATUS WITH IMPROVED PRODUCT LOADER
Filed April 28, 1965  3 Sheets-Sheet 2
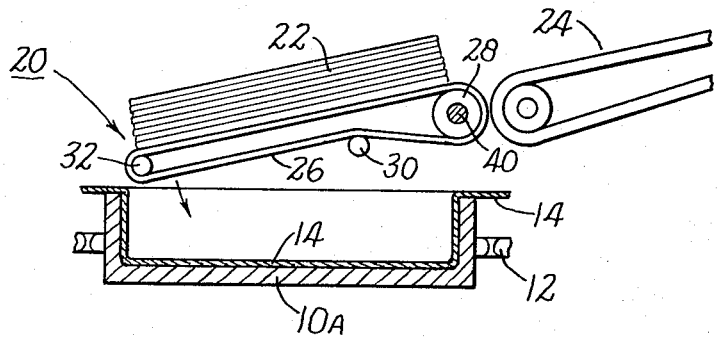
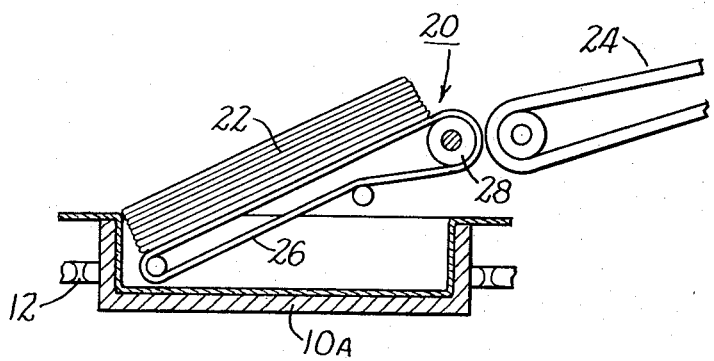
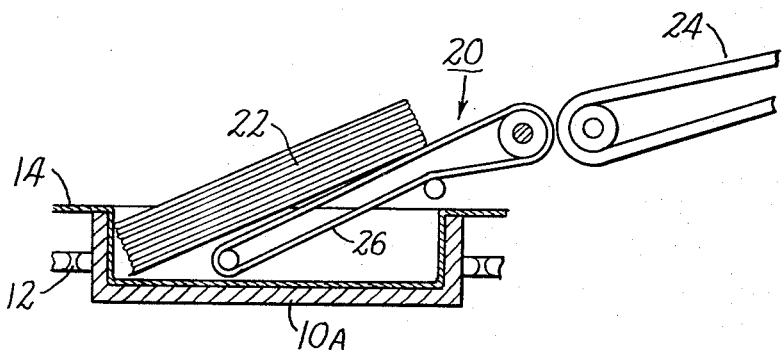
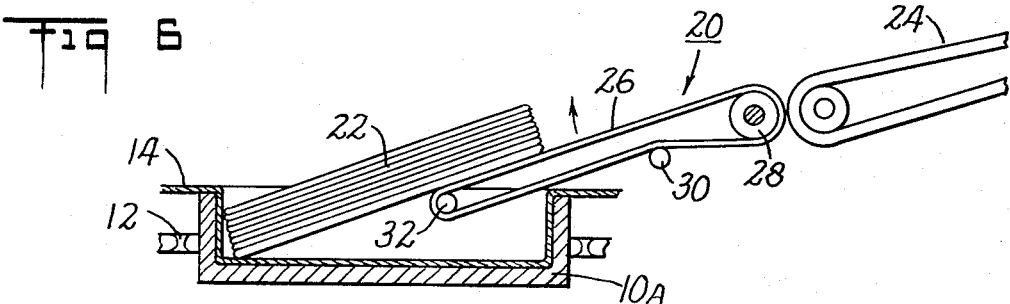

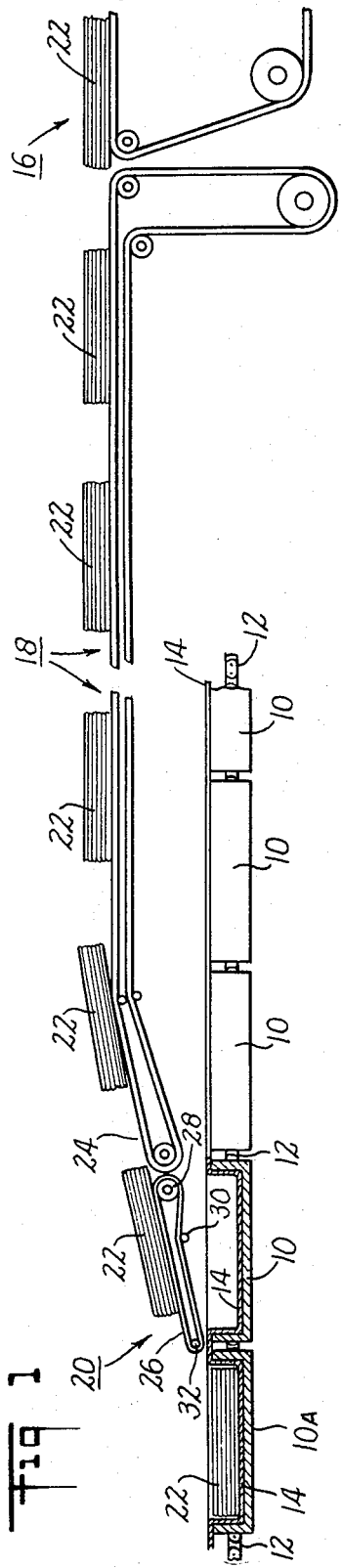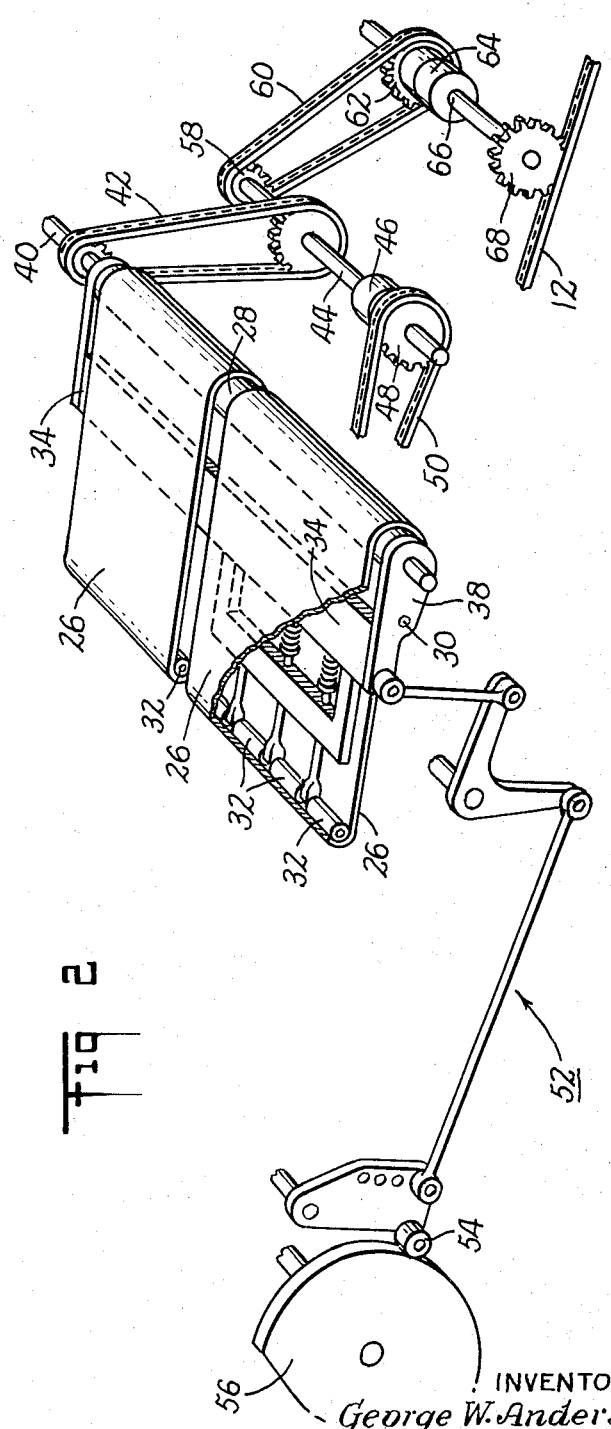

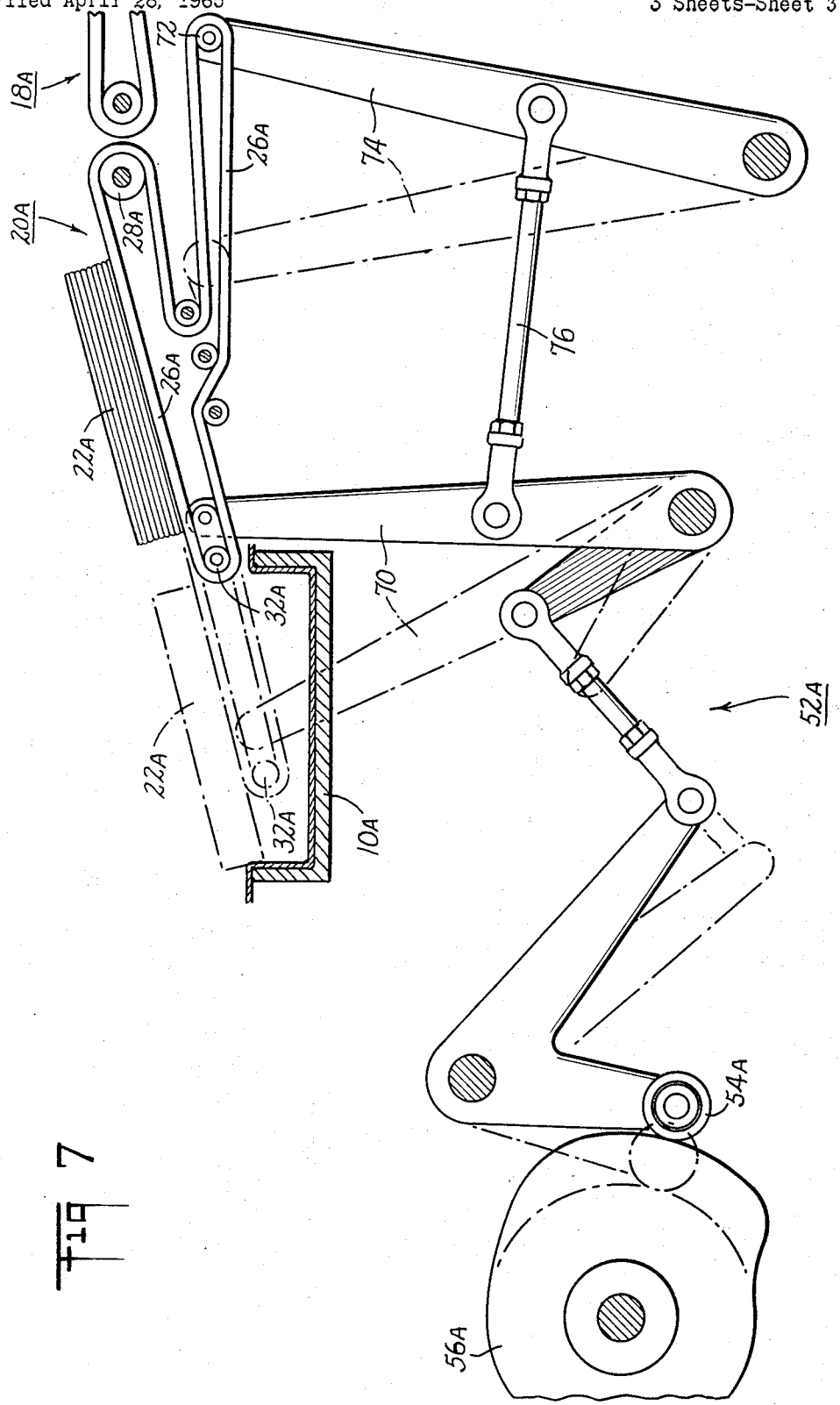

United States Patent Office 3,354,613
Patented Nov. 28, 1967

3,354,613
PACKAGING APPARATUS WITH IMPROVED
PRODUCT LOADER
George W. Anderson, Little Falls, John R. Harder, Cedar Grove, and Reid A. Mahaffy, Montclair, N.J., assignors to Mahaffy & Harder Engineering Company, Totowa, N.J.
Filed Apr. 28, 1965, Ser. No. 451,543
8 Claims. (Cl. 53—251)

ABSTRACT OF THE DISCLOSURE

Packaging apparatus having a plurality of cup-shaped packaging trays mounted in an endless chain for movement past a series of operating stations where sequential packaging operations are performed, there being provided a loader device for transporting products to be transferred into the packaging trays, the loader device including an endless conveyor belt mounted for pivotal movement at one end to accommodate vertical translation of the other end into and out of the trays at appropriate times during progression thereof around the endless loop, the speed of movement of the conveyor being automatically controlled to match the speed of advance of the tray at the time product transfer takes place.

---

This invention relates to packaging machines of the type comprising a plurality of package-holding elements mounted for movement around an endless loop. More particularly, this invention relates to novel means for automatically loading products, such as stacks of sliced luncheon meat or bacon, into partially-formed packages while the machine is in operation.

For a number of years now there has been extensive use of automatic packaging machines adapted to form evacuated packages from continuous webs of stretchable plastic packaging film. A particularly successful machine of this type is shown in U.S. Patent 3,061,984. Such machines include an endless chain carrying a plurality of dies in the form of trays, the chain being driven with an intermittent indexing motion past a series of packaging stations along an upper horizontal portion of the chain where various operations are performed during each "dwell" period. At one of these stations, a web of plastic packaging material is attached to the trays and is vacuum-formed down into the tray cavities to form cup-shaped partial package sections. Thereafter, the products are loaded into these package sections, and another web of plastic is placed over the top of the trays and heat-sealed to the bottom web, the resulting complete package being evacuated and, if required, filled with an inert gas before the final hermetic seal is made.

In early versions of such machines, the products were loaded by hand. Various types of automatic loading devices also were developed, for example the ram-type loading mechanism shown in U.S. Patent 3,180,066, issued on April 27, 1965, to Mahaffy et al. However, there has developed a need for more economical loading apparatus than presently available commercially, and it is one of the objects of this invention to meet that need.

Accordingly, it is an object of this invention to provide improved packaging apparatus. A more specific object of this invention is to provide improved means for mechanically loading products into packages formed by an automatic packaging machine. Other objects, aspects and advantages of the invention will in part be pointed out in, and in part apparent from, the following description considered together with the accompanying drawings in which:

FIGURE 1 is an elevation view, partly in section, of selected portions of the packaging machine;

FIGURE 2 is a perspective of the product delivery mechanism;

FIGURES 3 through 6 are enlarged detail sections illustrating approximately the sequence of events in depositing the products into the tray cavities; and FIGURE 7 shows a modified arrangement for loading products into the trays.

Referring now to FIGURE 1, there is shown packaging apparatus comprising a plurality of dies in the form of trays 10 which are secured to an endless chain 12 disposed in a generally oval-shaped loop in a vertical plane. Only the horizontal upper reaches of this loop are shown in FIGURE 1, but the remainder of the apparatus in this respect is similar to that disclosed in U.S. Patent 3,180,- 066, referred to above. The chain 12 is arranged to advance the trays (to the left in FIGURE 1) with an intermittent indexing motion past packaging stations including devices known in the art for making and evacuating packages formed from continuous sheets of plastic packaging material 14 is secured to the trays, as by conven- example be timed as disclosed in the above patent. At one of the packaging stations the sheet of plastic packaging material 14 is secured to the trays, as by conventional clamps, and is stretched down into the tray cavities by vacuum applied to the bottom of each tray in sequence.

Above the trays 10 is a conveyor system comprising three conveyor segments 16, 18 and 20 arranged end-to-end so as to transfer the products 22 in a leftward direction to the loading position over the tray 10A. The first and second conveyors 16 and 18 are like the corresponding units shown in the above-identified patent, including the use of block-shaped traveling flights (not shown herein) over the first conveyor 16 to set the spacing between the products. One difference is that in the present construction the output end 24 of the second conveyor 18 is tilted downward at a relatively small angle. The two conveyors 16 and 18 operate at a constant (invariant) speed of advance having a magnitude sufficient to maintain the product flow at the rate required by the average surface speed of the trays 10.

The third conveyor 20 is a small unit consisting of two side-by-side belts 26 (see also FIGURE 2) extending around a driven roller 28, a slack take-up roller 30, and a plurality of forward idler rollers 32. These two belts are arranged to receive corresponding sets of side-by-side products (or one set of full-width products) from the output end 24 of conveyor 18. The axis of driven roller 28 is fixed in position with reference to the machine frame, while the idler rollers 32 are supported by a cross arm 34 and associated structure which is pivotally mounted by side arms 38 about the axis of drive roller 28 to provide a translatory motion of the idler roller axis in an approximately vertical direction.

The drive roller 28 is turned by a shaft 40 driven by a chain 42 from a second shaft 44. For a major portion of the machine cycle, shaft 44 is rotated at constant speed, the power being supplied through an over-ride clutch 46 the input sprocket 48 of which is connected to the main machine drive motor by a chain 50 and other conventional means not shown herein.

Side arms 38 are connected by an adjustable link and lever system 52 to a cam follower 54 riding on a cam 56 driven at constant speed by the main machine drive motor. Cam 56 makes one revolution for each indexing cycle of the machine, and is arranged to tip the conveyor 20 down into a waiting tray 10 during the "dwell" portion of this cycle.

The sequence of events is illustrated diagrammatically by FIGURES 3–6. FIGURE 3 shows the conveyor 20 shortly after the tray 10A has reached its dwell position where it remains for a major part of the machine timing cycle. FIGURE 4 shows the conveyor rocked down into the tray cavity, the downward motion being provided by a conventional spring loading of the lever system 52 but not shown herein. The products 22 (here a stack of luncheon meat) are shown pressed forward against the leading edge of the tray. This step can be provided to assure that the products are lined up with the tray cavities before the loading operation is carried out, the belts 26 sliding underneath the products during such alignment.

FIGURE 5 shows that the tray 10A has started its indexing motion while the conveyor 20 is down in the tray cavity. The continuing movement of the belts 26 causes the products 22 to be transferred to the bottom of the tray cavity during this indexing motion.

As indicated by the timing diagram in the above-mentioned U.S. Patent 3,180,066, the indexing motion of the trays consists of an initial and fairly short acceleration of reasonably high value, followed by substantial movement at a relatively high velocity, and then a subsequent rapid deceleration to the next dwell position. The velocity of the tray during this movement necessarily exceeds the average surface speed of the trays to which the normal advancing movement of the conveyor belts 26 is keyed. In one aspect of the present invention, this speed variance is accommodated by a special mechanism which causes the belt movement to keep pace with the accelerated motion of the trays.

In more detail, and reverting to FIGURE 2, shaft 44 carries another sprocket 58 which is connected by a chain 60 to the sprocket 62 of a second over-ride clutch 64, identical to clutch 46. The input 66 of clutch 64 is driven by a sprocket 68 engaged with the chain 12, along its lower horizontal reaches. During most of the machine cycle, chain 12 is stopped for the dwell period, and sprocket 62 is turned at constant speed by shaft 44 while the clutch is effectively disengaged because the angular velocity of sprocket 68 is less than that of sprocket 62. However, as the trays accelerate during the indexing movement, sprocket 68 quickly reaches an angular velocity exceeding that of sprocket 62, and at that point the over-ride clutch 64 automatically is engaged so as to transmit its input motion to shaft 44. Thus shaft 44 speeds up, disengaging clutch 46, and causing the surface speed of belts 26 to keep pace with the movement of the tray 10A. During the deceleration phase of the tray indexing movement, the speed of shaft 44 ultimately drops to the speed of sprocket 48 at which time clutch 46 is re-engaged so that the belts 26 thereafter are driven at constant speed to bring the next set of products into position for loading.

As the tray 10A advances between the positions shown in FIGURES 4, 5 and 6, the belts 26 are driven at an accelerated speed having a horizontal component of velocity matching that of the tray. Thus the products are maintained in alignment with the tray cavities during the loading operation.

As the tray 10A approaches the end of its indexing motion, the lever system 52 operates to lift the conveyor 20 up in order to avoid interference with the trailing edge of the tray. This is illustrated in FIGURE 6. Ultimately, the products move off the end of the belts 26 and their rear end drops down into the cavity. After the loading operation, and just before the trays reach the new dwell position, the conveyor will have been moved up entirely above the top surface of the trays, as indicated in FIGURE 1.

FIGURE 7 shows a modified loader construction arranged to deposit the products 22A into a waiting tray 10A entirely during the dwell period, that is, without any motion of the tray. Here the loading is carried out by a conveyor section 20A having a belt 26A driven at constant speed at all times by a drive roller 28A. The input end of conveyor 20A is supplied with the products by conveyor 18A, similar to conveyor 18 of FIGURE 1 but not necessarily including a downwardly tipped output end.

The output end of conveyor 20A comprises a roller 32A which is mounted for translatory movement effected by a vertical lever 70 pivotally supported at its lower end. The belt 26A extends around several idler rollers and a slack take-up roller 72. This latter roller is mounted on another lever 74 which is pivoted at its lower end and connected by an arm 76 to lever 70 for movement therewith.

Lever 70 is connected by a link and lever system 52A to a cam follower 54A riding on a cam 56A. This cam is rotated at constant speed by the main machine motor, and makes one revolution for each complete operating cycle of the packaging machine. While the machine is in its dwell period, the cam goes through its loading cycle wherein the follower 54A first is moved to the left (by conventional spring loading), so as to swing the lever 70 counterclockwise to its position shown in interrupted outline, and then moves back to the right to return the lever 70 to its original position.

This pivoted movement of lever 70 carries the front roller 32A forwards and downwardly into the cavity of the waiting tray 10A, as shown in light outline. The take-up roller similarly moves forward to accommodate the change in position of the belt 26A, and to maintain the belt taut during loading.

While the conveyor 20A is in its forward position, the continued movement of the belt 26A advances the products into the waiting tray 10A, advantageously into contact with the forward wall of the tray. In any event, near the end of the dwell cycle, the conveyor 20A is returned to its normal position, the belt 26A continuing to move forward with the same constant speed relative to the stopped tray. Ultimately, the conveyor will be fully retracted, and the rear edge of the products will drop off the front end of the belt 26A into the tray. Thereafter, the trays will be indexed one position forward, and the loading operation will be repeated for the next waiting tray.

Although specific embodiments have been described herein in detail, it should be understood that this has been for the purpose of illustrating the invention, it being recognized that various modifications will be made to suit particular applications, and that no limitation of the scope of the invention is to be implied from the disclosure herein other than as required by the prior art.

What is claimed is:

1. Packaging apparatus of the type including a plurality of package supporting elements mounted in an endless loop for progressive movement around that loop, means for moving said package supporting elements with an intermittent indexing motion so that various package forming operations can be performed during the dwell period between each advancing step, said elements having means to hold package sections shaped to receive products to be packaged, said elements in a portion of said loop being arranged to support said package sections with the openings thereof facing upwards to receive products from above; a conveyor arranged to bring the products to a position above said loop portion and including endless belt means adapted to receive and support the products and to transfer them to a position immediately above one of the package sections in said loop portion, means mounting the output end of said conveyor belt means for translatory movement having a vertical component to shift said output end down towards the waiting unfilled package section, and control means synchronized with the movement of said endless loop of elements for effecting said translatory movement towards the waiting package section to deposit therein the products as they leave said conveyor, said control means including means operative to shift said conveyor belt means down towards the waiting package section during the dwell period between indexing steps.

2. Apparatus as claimed in claim 1, wherein said control means includes means effective to maintain said conveyor belt means in loading position during at least part of the time said elements are being shifted from one dwell position to the next; and drive means for moving said belt means with a surface velocity matching that of said elements during said part of the time, so that the products will be maintained in proper position relative to said elements as they are being loaded into said package sections during the advancing movement thereof.

3. Apparatus as claimed in claim 1, wherein said control means includes means to shift said conveyor belt means down towards the package section and back again to normal position during the time the waiting package section is stationary in its dwell period.

4. Apparatus as claimed in claim 3, wherein said belt means output end is moved by said control means with a substantial forward horizontal component of motion while said output end is shifted down towards the waiting package section, said belt means being operative to shift the products against the forward wall of the waiting package section so that the products drop down in proper alignment in the package section as the conveyor belt means output end is retracted back and up in an approximately horizontal movement.

5. Packaging apparatus of the type including a plurality of package supporting elements mounted in an endless loop for periodic intermittent indexing movement around that loop, said elements having means to hold package sections shaped to receive products to be packaged, said elements in a portion of said loop being arranged to support said package sections with the openings thereof facing upwards to receive products from above; a conveyor system arranged to bring the products to a position above said loop portion, said system comprising first and second conveyor segments disposed end-to-end so that the product output of the first conveyor segment is picked up by the second conveyor segment, said second conveyor segment including endless belt means adapted to receive and support the products and to transfer them to a position immediately above one of the package sections in said loop portion, means mounting the output end of said belt means for translatory movement in a substantially vertical direction so that said output end is shiftable down towards the waiting unfilled package section, control means synchronized with the movement of said endless loop of elements for shifting said output end down towards a waiting package section to permit the deposit therein of the products as they leave said second conveyor segment, and drive means for matching the surface velocity of said belt means to the advancing movement of said elements during at least the initial portion of the indexing movement, whereby the products can be loaded during that portion of the indexing movement.

6. Apparatus as claimed in claim 5, wherein said control means includes over-ride clutch means driven by the movement of said elements and having an output connected to said belt means, said clutch means being disengaged while said elements are stopped and automatically engaged when said elements reach a speed greater than the normal speed-of-advance of said belt means.

7. Apparatus as claimed in claim 5, wherein said belt means is mounted at its input end by a driven roller the axis of which is fixed relative to said packaging apparatus, the output end of said belt means including idler roller means supported for pivotal movement about said axis of said driven roller.

8. Packaging apparatus of the type including a plurality of package supporting elements mounted in an endless loop for variable speed movement around that loop, said elements having means to hold package sections shaped to receive products to be packaged, said elements in a portion of said loop being arranged to support said package sections with the openings thereof facing upwards to receive products from above; a conveyor system arranged to bring the products to a position above said loop portion, said system comprising endless belt means adapted to receive and support the products and to transfer them from an output end of the belt means to a position immediately above one of the package sections in said loop portion, means mounting said output end of said belt means for translatory movement in a substantially vertical direction so that said output end is shiftable down towards an unfilled package section, control means synchronized with the movement of said endless loop of elements for shifting said output end down towards a waiting package section to permit the deposit therein of the products as they leave said belt means, and belt drive means for matching the surface velocity of said belt means to the advancing movement of said elements during at least the initial portion of the movement of said elements immediately following the loading of the products.

References Cited
UNITED STATES PATENTS 3,271,927   9/1966   Molins _____ 53—236

ROBERT C. RIORDON, *Primary Examiner.*

R. ALVEY, *Assistant Examiner.*